(No Model.)
H. B. SHERIDAN.
REGULATOR FOR ELECTRIC STORE BOXES AND LIGHTS.
No. 253,435. Patented Feb. 7, 1882.
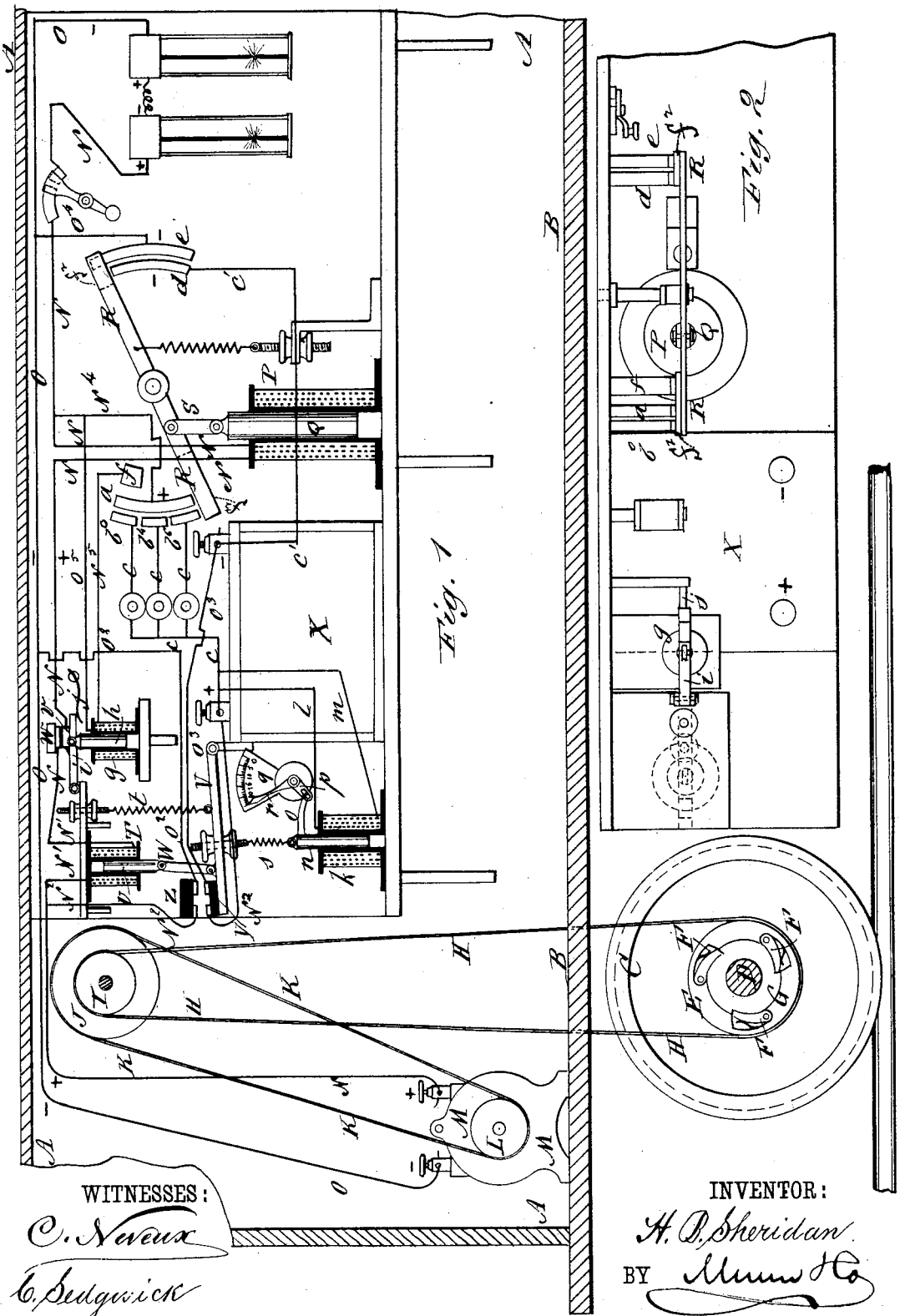
WITNESSES:
C. Neveux
C. Sedgwick
INVENTOR:
H. B. Sheridan
BY Munn & Co
ATTORNEYS.

UNITED STATES PATENT OFFICE.

HENRY B. SHERIDAN, OF CLEVELAND, OHIO.

REGULATOR FOR ELECTRIC STORE-BOXES AND LIGHTS.

SPECIFICATION forming part of Letters Patent No. 253,435, dated February 7, 1882.

Application filed August 11, 1881. (No model.)

To all whom it may concern:

Be it known that I, HENRY B. SHERIDAN, of Cleveland, in the county of Cuyahoga and State of Ohio, have invented certain new and useful Improvements in Regulators for Electric Store-Boxes and Lights, of which the following is a specification.

In the accompanying drawings, Figure 1 is a side elevation of my improvement, partly in section. Fig. 2 is a plan view of a part of the same.

Similar letters of reference indicate corresponding parts.

This invention relates to a system of lighting by electricity, and has for its object to keep the lamps alight by shunting into the circuit automatically a box stored with electricity. The storage-box can be charged with electricity directly from the generator, and by an automatic mechanism made to supply the lamps in circuit with sufficient electricity to keep them alight; or the storage-box can be connected with the generator and the circuit in such a manner as to receive and retain the surplus electricity when more is generated than required to support the lights, and give out the stored electricity when less is generated than is required to support the lights.

The improvement is particularly intended for railroad passenger-cars and freight-trains, and especially for elevated railroads, where the generators can be placed at the termini, and the storage-boxes filled at each end of the route with sufficient electricity to light the train in its passage from one terminus to the other. On passenger-trains, especially upon surface-roads, a dynamo-electric machine or generator can be driven from the axle of the car when running, so as to generate a constant current of electricity, and the sudden stoppage of the current and the extinction of the lamps in circuit when the train stops can be prevented by charging a suitable storage-box with the surplus electricity, and connecting therewith and with the main circuit a regulator arranged to operate automatically to supply the circuit with electricity and keep up the light during the stoppage of the train. As a train is liable to be broken into sections and some of the cars switched upon other lines, it is necessary that each car should be provided with a storage-box and automatic regulator to keep up the light until the said car is again connected with a train. The improvement is intended to be so arranged that a train running at the rate of twenty-five miles an hour will generate a continuous current of electricity sufficient to supply its lamps; but as nearly all trains exceed this speed, and consequently will generate a greater quantity than its lamps require, the surplus electricity will pass into the storage-boxes, ready to be used when the train stops or is running at a less speed than twenty-five miles an hour, and thus fails to generate the requisite amount of electricity.

The invention consists in the combination, with the car-axle and a dynamo-electric machine, of the pulley and the pawls and ratchet-wheel that connect the said pulley with the axle and the belts and pulleys that connect the axle-pulley with the machine; also, in the combination, with the dynamo-electric machine, the circuit-wires, and the storage-box, of the magnet, the hinged lever, constructed of insulating material and provided at its ends with plates of metal, the insulated connections, the rheostats, and the connecting-wires, whereby the excess of electricity beyond the amount necessary to keep the lamps alight will be automatically conducted into and stored in the said storage-box; also, in the combination, with the dynamo-electric machine, the main line, and the storage-box, of the magnet, the switch-blocks, the rheostats, and the connecting-wires, whereby the deficit of electricity below the amount necessary to keep the lamps alight will be automatically supplied from the storage-box; also, in the combination, with the dynamo-electric machine, the main line, having switch, the storage-box, the magnet, the lever connected with the said magnet, constructed of insulating material and provided with conducting material on a portion of the inner surface of its arm, the switch-blocks, the rheostat, and the connecting-wires, of the magnet, the arm and spring, the insulated connections, the connection-wires, and the switch-blocks, whereby, when the generated current becomes very weak or stops and the lamps are kept alight from the storage-box, the main circuit is broken to prevent the current of electricity from passing back to the generator; and, also, in the combination, with the dynamo-electric machine, the storage-box, the magnet, the lever, the insulated connections, and the wires, of the magnet, the arm, the lever, the hand, the dial, and the springs, whereby the amount of electricity in the storage-box will be accurately indicated, as will be hereinafter fully described.

In the drawings, A represents the body, B the floor, C a wheel, and D an axle, of an ordinary baggage-car. Upon the axle D is placed a pulley, E, which is provided with a number of spring-pawls, F, which engage with a ratchet-wheel, G, attached to the said axle D, so that the said axle will carry the said pulley with it when turned forward, but when turned back will allow the said pulley to stand still.

H is a belt, which passes around the pulley E and around a pulley, I, journaled to a bracket or other support attached to the upper part of the car-body A. With the pulley I is rigidly connected a larger pulley, J, around which passes a belt, K. The belt K also passes around the pulley L, attached to the shaft of the dynamo-electric machine or generator M, attached to the car-floor B. With this construction, when the car is running a current of electricity will be generated and sent through the main wires N O of the circuit. The positive wire N is connected with the magnet P, so that the current of electricity passing through the said wire N will pass through the said magnet P and attract its core Q and with it the lever R, which is constructed of insulating material and provided at its ends with the metallic strips $f^2$ $f^2$, and is connected with the said core by a link-connection, S. If the speed of the train is increased so that a stronger current of electricity will be generated than is necessary to supply the lamps in the circuit, the magnet T, which is shunted in the main line by the wires N' N' and has a certain resistance, will attract its core U and with it the lever V. The lever V is connected with the magnet-core U by a link-connection, W, and when the strength of the current exceeds that necessary to feed the lamps the core U is drawn farther into the magnet T, and by this movement switches the store-box X into the circuit by bringing the insulated conductor Y, attached to the said lever V, in contact with the stationary insulated conductor Z, attached to the car-body. The stationary conductor Z is connected with the main line by the wires $N^2$ $O^2$ and the conductor Y is connected with the binding-posts of the storage-box X by the wires $N^3$ $O^3$. By this construction the surplus electricity will be passed into the box X and be stored. If the speed of the train is decreased and the strength of the generated current lessened, the magnet T will cease to hold the lever V, and will thus disconnect the storage-box X from the circuit. If the speed of the train becomes very slow or if the train stops, the magnet P will cease to attract the core Q and with it the lever R. This brings the said lever in contact with and forms a connection between the switch-block a and one of the series of switch-blocks $b^6$ $b^4$ $b^0$. Each of the switch-blocks $b^6$ $b^4$ $b^0$ is the end of a shunt, c, the other end of which is connected with the positive binding-post of the storage-box X. The switch-block a is connected with the positive main wire N by the wire $N^4$, and the negative binding-post of the store-box X is connected with the negative main wire O by the wire c', the switch-blocks d e, and the wire $o^4$. The connection between the switch-blocks d e a $b^6$ $b^4$ $b^0$ is formed by plates $f^2$ on the ends of the lever R, so that the storage-box X will be shunted in the main line, and the electricity to supply the lamps will be taken from the said storage-box X.

The shunts b are marked respectively $b^6$ $b^4$ $b^0$, as their capacity of resistance varies, and the lever R will move up from one to another of the said shunts as the speed of the train decreases and the generated current lessens, coming to the shunt $b^0$, when the train stops and electricity is no longer generated, in which case the lamps will be wholly supplied from the storage-box X. When the lever R comes in contact with the shunt $b^0$ it also comes in contact with the switch-block f and switches the magnet g into the circuit by means of the wires $N^5$ $O^5$, the wire $N^5$ connecting the switch-block f and the magnet, and the wire $O^5$ connecting the magnet and the wire $N^4$ of the circuit. The passage of the current through the magnet g attracts the core h of the said magnet, and the arm i, connected with the said core by a hinge-connection, the said arm being hinged at one end to a support attached to the car-body.

With the arm i is connected, by an insulated connection, v, one part of a switch in the main-line wire N, the other part of the said switch being connected with an insulated support, w, attached to the car-body. With this construction, as the electric current passes through the magnet g and attracts the core h and arm i it cuts off the main line by separating the blocks v w, and thus prevents the current from the storage-box X from going back to the generator and compels the said current to go forward through the lamps. When no current is passing through the magnet g the arm i is raised by a spring, j, attached to the car-body, or other suitable support, and connected with the free end of the said arm i, by which means the blocks v w, forming part of the positive main line, are retained in contact.

k is a magnet, which is shunted by means of the wires l m to the positive wire c of the storage-box circuit, between the positive electrode of the said storage-box and the shunts $b^6$ $b^4$ $b^0$, so that when a current is passing through the said wire c the magnet k will attract its core n and move the arm o, rigidly connected with the said core. The arm o is hinged to the end of the lever p, the other end of which is pivoted to the dial q, and carries a hand, r, that moves along a scale of division-marks upon the said dial q, to indicate the amount of electricity stored in the box X. The dial shall be of such convenient form and shape as may be required to properly and correctly represent the force of the electric current. The magnet $k$ has a certain resistance, and the core $n$ stands under the tension of the springs $s\ t$, connected with the lever V, so that the said core will be moved forward under the increasing attraction of the said magnet $k$, and will cause the hand $r$ to indicate the amount of electricity stored in the box X, and when the said hand $r$ reaches the highest degree marked upon the dial $q$ the box X will be stored to its greatest capacity. When the box X has been filled with electricity the attraction upon the core $n$ becomes so great as to draw down the lever V and break the connection between the storage-box X and the main circuit. It is to be understood that proper resistances will be inserted in the main circuits between the terminals of the branch circuits, so as to divert the required amount of current to the branches.

Having thus fully described my invention, I claim as new and desire to secure by Letters Patent—

1. The combination, with the car-axle D and a dynamo-electric machine, of the pulley E, pawls F, ratchet-wheel G, and the belts and pulleys H K I J L, substantially as herein shown and described, whereby electricity will be generated by the advance of the car, as set forth.

2. In a regulator for electric store-boxes, the combination, with the dynamo-electric machine M, the circuit-wires N O, and the storage-box X, of the magnet T, the hinged lever V, connected with the core of the magnet T, the insulated connections Y Z, and the connecting-wires $N'\ N'\ N^2\ O^2\ N^3\ O^3$, substantially as herein shown and described, whereby the excess of electricity beyond the amount necessary to keep the lamps alight will be automatically conducted into and stored in the said storage-box, as set forth.

3. In a regulator for electric store-boxes, the combination, with the dynamo-electric machine M, the positive circuit-wire N, and the storage-box X, of the magnet P, the lever R, and the switch-blocks $a$, $b^6$, $b^4$, $b^0$, and $d\ e$, and the connecting-wires $c\ c'$, and $N^4\ O^4$, substantially as herein shown and described, whereby the deficit of electricity below the amount necessary to keep the lamps alight will be automatically supplied from the storage-box, as set forth.

4. In a regulator for electric store-boxes, the combination, with the dynamo-electric machine M, the positive circuit-wire N, having switch, the storage-box X, the magnet P, the lever R, the switch-blocks $a$, $b^6$, $b^4$, $b^0$, and $d\ e$, the connecting-wires $c\ c'$ and $N^4\ O^4$, of the magnet $g$, the arm $i$ and spring $j$, the insulated connections $v\ w$, the connecting-wires $N^5\ O^5$, and the switch-block $f$, substantially as herein shown and described, whereby, when the generated current becomes very weak or stops, and the lamps are kept alight from the storage-box, the main circuit is broken to prevent the current of electricity from passing back to the generator, as set forth.

5. In a regulator for electric store-boxes, the combination, with the dynamo-electric machine M, the storage-box X, the magnet T, the lever V, the insulated connections Y Z, and the wires $N'\ N'\ N^2\ O^2\ N^3\ O^3$ and wire $c$, included in the circuit of the storage-box, of the magnet $k$, the arm $o$, the lever $p$, the hand $r$, the dial $q$, and the springs $s\ t$, substantially as herein shown and described, whereby the amount of electricity in the storage-box will be accurately indicated, as set forth.

HENRY B. SHERIDAN.

Witnesses:
JAMES T. GRAHAM,
C. SEDGWICK.